INVENTORS
GEORGE S. ALMASI
GEORGE E. KEEFE
YEONG S. LIN
DAVID A. THOMPSON

BY  J.E.S̸ranlan

AGENT

United States Patent Office 3,716,781
Patented Feb. 13, 1973

3,716,781
MAGNETORESISTIVE SENSING DEVICE FOR DETECTION OF MAGNETIC FIELDS HAVING A SHAPE ANISOTROPY FIELD AND UNIAXIAL ANISOTROPY FIELD WHICH ARE PERPENDICULAR
George S. Almasi, Purdy Station, George E. Keefe, Montrose, Yeong S. Lin, Mount Kisco, and David A. Thompson, Somers, N.Y., assignors to International Business Machines Corporation, Armonk, N.Y.
Filed Oct. 26, 1971, Ser. No. 193,904
Int. Cl. G01r 33/02
U.S. Cl. 324—46
34 Claims

ABSTRACT OF THE DISCLOSURE

A magnetoresistive sensing device for detection of magnetic flux, comprising a magnetoresistive sensing element in which the shape anisotropy field is substantially perpendicular to the uniaxial anisotropy field. The larger of these two magnetic fields is in a direction which is substantially normal to the direction of the signal flux which is to be detected, to insure that the magnetization vector of the sensing element will return to its rest state when the signal magnetic flux is removed. The easy axis of the sensing element can be either parallel or normal to the signal magnetic field direction. Current through the sensing element is preferably provided by a constant current source connected to the element. The direction of current through the element can be either along the direction of the quiescent magnetization state or perpendicular to it. Applications include magnetic bubble domain sensing and sensing of stored magnetic signals on disks or tapes.

BACKGROUND OF THE INVENTION

This invention relates to an improved magnetoresistive sensing device, and in particular to such a device which compensates for the effect of demagnetization in the sensing element, thereby allowing detection of very small magnetic signals.

DESCRIPTION OF THE PRIOR ART

Detection of small magnetic signals can be difficult, even when magnetoresistive sensing is used. For instance, in a cylindrical magnetic domain (bubble domain) environment in which bubble domains are propagated in the magnetic sheet and sensed by a magnetoresistive sensing element located on the sheet, it is difficult to detect very small bubbles. As packing densities increase for memory applications, the size of the bubble domains decreases and the total flux from the domains decreases. In order to affect the magnetization vector of the magnetoresistive sensing element, the average stray magnetic field from these small bubbles must overcome the demagnetizing field of the sensing element. That is, the bubble domains must supply a magnetic field at least about equal to the demagnetizing field $H_d$ plus the anisotropy field $H_k$ in order to achieve maximum signal.

As a further example of the difficulty in detecting small bubble domains, consider the case of domains less than 0.001 inch in diameter. The sensing element cannot be thinner than approximately 100–200 angstroms without degradation of its magnetoresistance characteristics. For most efficient sensing, the width ($w$) of the sensing element in which the magnetization is rotated is chosen to be approximately the bubble diameter ($d$). Thus, the demagnetizing field $H_d \simeq (t/w) \, (4\pi M_p)$, where $t$ is the thickness of the sensing element and $w$ is the width of the element, while $M_p$ is the saturation magnetization of the sensing element. For a sensing element of permalloy with the dimensions described, a sensor (with thickness 200 angstroms) for a 5 micron bubble domain would require a bubble domain field greater than 40 oe. in order to change the resistance of the sensing element. However, a bubble domain field is generally about 10% of the quantity $4\pi M_s$, where $M_s$ is the saturation magnetization of the bubble element, which is typically 20 oe. Thus, it is readily apparent that detection of small bubble domains is a difficult problem.

In the bubble domain environment and in the magnetic recording environment, the use of transverse bias has been proposed to aid in detection of small magnetic signals. For instance, copending application Ser. No. 89,964 filed Nov. 16, 1970 in the name of G. S. Almasi et al., and assigned to the present assignee, describes a sensing device in which the propagation magnetic field used to move the bubble domains is also used to transversely bias the magnetoresistive sensing element so that its response to bubble domain fields will be linear. In the magnetic recording area, the Hunt patent U.S. 3,493,694 shows the use of transverse bias to sensitize the magnetoresistive sensing elements for detection of small magnetic signals.

Although the use of a transverse magnetic bias on a magnetoresistive sensing element aids in the detection of small magnetic signals, the total resistance change of the sensing element is still limited since the threshold of the element remains the same. That is, since the stray magnetic field to be sensed is small with respect to the magnetic field required to saturate the sensing element, transverse bias increases the resistance change of the sensing element for the small applied signal, although it does not provide the maximum resistance change which would be obtained if a magnetic field having a strength equal to the saturating field were available.

In order to alleviate these problems, it is proposed to lower the threshold of the magnetoresistive sensing element so that it can detect small magnetic signals and provide full amplitude swing. That is, a transverse bias is no longer required and the maximum signal available from the magnetoresistive sensing element is equivalent to that which would be obtained if a magnetic signal having a magnitude sufficient to saturate the sensor were available. As will be apparent, this invention is useful both in bubble domain environments and in magnetic recording environments, and in any application where small magnetic signals are to be detected.

Accordingly, it is a primary object of this invention to provide an improved magnetoresistive sensing device for detection of very small magnetic signals.

It is another object of this invention to provide improved magnetoresistive sensing of very small magnetic signals, without the need for a magnetic transverse bias field.

It is another object of his invention to provide an improved magnetoresistive sensing device for very small magnetic signals which is easily fabricated by conventional techniques.

It is a still further object of this invention to provide an improved magnetoresistive sensing element for detection of small magnetic fields in which the adverse effect of demagnetization within the sensing element is compensated.

It is a still further object of this invention to provide an improved magnetoresistive sensing element having a maximum output even when detecting magnetic fields of magnitudes less than the conventional saturation field for such sensing elements.

It is another object of this invention to provide an improved magnetoresistive sensing device in which the magnetic threshold of the sensing element is reduced.

SUMMARY OF THE INVENTION

A magnetoresistive sensing device is provided which has utility in the detection of any type of magnetic signal. The sensing element is responsive to the total flux contained in the magnetic signal to be detected and is particularly suitable in a cylindrical magnetic domain environment where very small cylindrical domains are to be detected. The sensing device is also useful for detecting magnetic signals from recording media, such as tapes and disks. In general, a low threshold magnetoresistive detector is provided which will provide maximum output signals even in response to magnetic signals of magnitudes sufficiently less than that which would normally be required to saturate the sensing elements.

In more detail, the magnetoresistive sensing device is comprised of a magnetoresistive sensing element which is in proximity to the magnetic signal to be detected. The sensing element is located in a flux-coupling proximity to the magnetic signal to be detected, and is comprised of any magnetoresistive material. A particularly suitable material is permalloy, since this material can also be used to propagate bubble domains in a bubble domain environment. For further examples of magnetoresistive sensing materials, reference is made to copending application, S.N. 78,531, in the name of G. S. Almasi et al., filed Oct. 6, 1970, and assigned to the present assignee.

The magnetoresistive sensing element is characterized by having a shape anisotropy magnetic field ($H_{shape}$) which is perpendicular to the uniaxial anisotropy field ($H_k$). The larger of these two anisotropy fields is perpendicular to the direction of the magnetic signal field which intercepts the sensing element, in order to insure that the magnetization vector M of the sensing element returns to its rest state when the magnetic signal field is removed. For instance, if the sensing element is used to detect bubble domains, the larger of the shape anisotropy field and the uniaxial anisotropy field is in a direction substantially normal to the stray magnetic field of the bubble domain which intercepts the sensing element. This will insure that the magnetization vector M of the sensing element, which is rotated when the bubble domain field intercepts the sensing element, will return to its rest state when the bubble domain field is absent.

The easy axis of the magnetoresistive sensing element can be either substantially perpendicular to the direction of the magnetic signal field or substantially parallel to the direction of this magnetic field. Further, the current direction through the magnetoresistive sensing element can be along the easy axis or hard axis of the magnetoresistive sensing element.

Connected across the magnetoresistive sensing element is a current source which preferably provides a constant measuring current $I_s$ through the sensing element. Because the resistance of the sensing element changes when the element is intercepted by a magnetic field, the total voltage across the element will also change, since the current through the element remains constant. Thus, the voltage signal from the magnetoresistive sensing elements are indicative of the presence and absence of magnetic signals. Of course, a constant voltage can be impressed across the elements, in which case current signal changes are detected as the resistance of the element changes.

In a preferred embodiment, a nonsquare magnetoresistive sensing element is provided in which the easy axis of the element is in a direction parallel to the short dimension of the element, rather than being along the length of the element as was previously done in aforementioned copending patent applications, Ser. No. 78,531 and Ser. No. 89,964. Consequently, the magnetoresistive sensing element has a threshold which is $|H_{shape}-H_k|$ rather than $|H_{shape}+H_k|$ as was previously the case. The shape anisothopy field $H_{shape}$ is the scalar difference between the demagnetizing fields associated with the long and short directions of a nonsymmetrical sensing element. Correspondingly, smaller magnetic signals can be detected since the magnetic field threshold for saturation of the sensing element is reduced.

The invention, although easily realized when a rectangular sensing element is used, will work for any nonsymmetrical sensing element geometry. As long as there is a shape anisotropy present in the element, this can be arranged at substantially right angles to the uniaxial anisotropy. As will be more apparent later, sensing elements of various shapes can be utilized to provide domain detection at lower thresholds than are conventionally present, by this invention.

These and other objects, features, and advantages will be more fully detailed in the following more particular description.

DETAILED DESCRIPTION OF THE PREFERRED EMBODIMENT

Figure 1A:
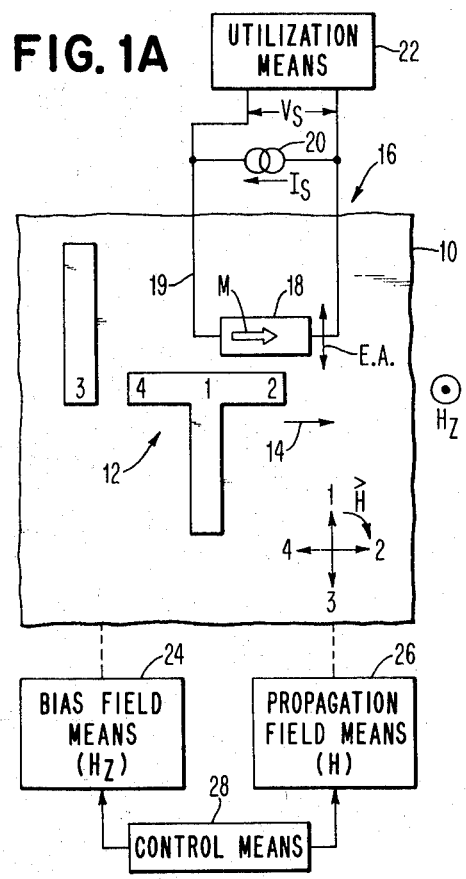
FIG. 1A is a diagram of an improved magnetoresistive sensing element having reduced magnetic field threshold whose easy axis is substantially parallel to the applied magnetic signal direction, shown in a bubble domain environment.

This improved magnetoresistive sensor utilizes a magnetoresistive sensing element in which the directions of the shape induced anisotropy field and the intrinsic anisotropy field are at right angles to each other. The result is that the amount of external magnetic field required to rotate the magnetization $M_p$ of the sensing element is substantially reduced.

As background for the invention, it is instructive to consider the various magnetic properties of the magnetoresistive sensing element which are used in this invention. The magnetic shape anisotropy field is defined as the scalar difference between the demagnetizing fields in the two directions of the sensing element. That is, the shape anisotropy field $H_{shape}$ is the difference of $H_{d_{short}}$ and $H_{d_{long}}$, where these latter two quantities are the demagnetizing fields along the short and long directions of the sensing element, respectively. The demagnetizing fields $H_d$ are fields which tend to prevent the magnetization vector M of the sensing element from being rotated in any direction from the rest position of this vector. Generally, the magnetic field required to saturate the magnetization of an isotropic sheet in any direction is given by the equation $$H_d = NM_s$$

where

N is a demagnetizing factor and
$M_s$ is the saturation magnetization of the isotropic sheet.

For instance, for a thin film with ellipsoidal cross section, N is approximately $4\pi t/w$, where:
$t$ = thickness of the film
$w$ = width of the film along the direction in which saturation is to occur
and $t \ll w$.

From this expression, it is readily apparent that the demagnetizing field increases in magnitude as the width of the sheet decreases, for a fixed thickness magnetic sheet. Consequently, for a rectangularly shaped magnetoresistive sensing element $H_{d_{short}}$, the demagnetizing field along the short direction, is greater than $H_{d_{long}}$, the demagnetizing field along the long direction of the sensing element.

As mentioned previously, any sensing element having unsymmetrical geometry can be used.

In a magnetic field with uniaxial anisotropy and without shape anisotropy, for example a film of infinite extent, the magnetization of a film is stable along only one axis which is defined as the easy axis of the film. The magnetization associated with this anisotropy is the magnetic anisotropy field ($H_k$) which is associated with the force that restores the magnetization vector M of the sensing element to a direction along the easy axis.

For a magnetoresistive sensing element of finite dimensions, the magnetic signal which will rotate the magnetization vector M of the element to change the resistance of the sensing element via the magnetoresistive effect must be at least equal to the sum of the shape anisotropy field $H_{shape}$ and the uniaxial anisotropy field $H_k$. However, when small magnetic signals are to be detected, difficulty arises because of the threshold requirement $|H_{shape}+H_k|$ of the sensing element. The sensing element is preferably of a length normal to the direction of the magnetic signal which is approximately equal to the effective width of the magnetic signal (in the case of a bubble domain, the length of the sensor through which the magnetization is rotated is approximately the bubble domain diameter). Further, the sensing element cannot be thinner than approximately 100-200 angstroms without its magnetoresistance properties being degraded. Consequently, the shape anisotropy field of the magetoresistive sensor, when added to the uniaxial anisotropy field $H_k$, will present a threshold greater than the applied magnetic signal. Therefore, the magnetic signal will not be sufficient to rotate the magnetization vector of the sensing element and inadequate voltage signals will be derived from the sensing element.

In order to alleviate this problem, this invention places the effective magnetic field due to shape anisotropy at substantially right angles to the effective magnetic field due to uniaxial anisotropy. In addition, the larger of these two effective anisotropy fields is substantially perpendicular to the direction of the magnetic signal field to insure that, in the absence of a magnetic signal, the magnetization vector M of the sensing element will return to its rest state. In this case, the threshold of the magnetoresistive sensing element is now $|H_{shape}-H_k|$. Accordingly, very small magnetic signals will provide full scale rotation of the magnetization vector of the sensing element, thereby providing full signal outputs from the magnetoresistive sensing element, without requiring transverse magnetic bias fields across the sensing elements.

Referring now to FIG. 1A, an improved magnetoresistive sensing device is shown in which the shape induced anisotropy and the intrinsic uniaxial anisotropy are arranged at right angles to each other, in contrast with traditional magnetic structures in which these anisotropies are parallel. In more detail, an improved magnetoresistive sensing device is shown in a bubble domain environment. In this environment, a magnetic sheet 10, such as orthoferrite or garnet, is provided in which the bubble domains exist and can be propagated.

For instance, the propagation means 12 illustrated in FIG. 1A is a T and I bar pattern comprised of soft magnetic material deposited on magnetic sheet 10, as is conventionally well known. Under the influence of a rotating, in-plane magnetic field H, bubble domains in sheet 10 move in the direction of arrow 14 when sequential magnetic poles are created at the positions labelled 1, 2, 3, and 4 of the T and I bar pattern 12.

Also located on sheet 10, or in close proximity to it, is a magnetoresistive sensing device generally indicated as device 16. Sensing device 16 comprises a magnetoresistive sensing element 18 which is comprised of a magnetoresistive material, such as permalloy. The sensing element 18 is electrically connected via leads 19 to a current source 20, which is preferably a constant current source providing measuring current $I_s$ through sensing element 18. The voltage change across element 18 in response to magnetic fields intercepting element 18 is detected as voltage signals $V_s$ which are sent to the utilization means 22, which is a sense amplifier or other form of detector. At this stage of the description, the magnetoresistive sensing device 16 and propagation pattern 12 are essentially the same as that shown in aforementioned copending application, Ser. No. 78,531 and Ser. No. 89,964. However, the differences will be more readily apparent later, when the anisotropy properties of sensing element 18 are discussed.

A bias field $H_z$ is applied in a direction normal to magnetic sheet 10 by means such as the bias field means 24. This means 24 is a coil surrounding magnetic sheet 10 or a permanent magnet. Also, it is known to provide a magnetic sheet adjacent sheet 10 which is exchange coupled to sheet 10 and provides the bias required to stabilize domains within magnetic sheet 10. These bias means are well known as can be seen by referring to U.S. 3,508,221 (permanent magnet) and U.S. 3,529,303 (exchange coupled sheets).

The propagation field H is a rotating, in-plane magnetic field which rotates in the direction of the arrows shown in FIG. 1A. This field is produced by the propagation field means 26, which is a series of X and Y coils surrounding magnetic sheet 10, that are capable of being alternately pulsed to provide an in-plane field sequentially rotated in the directions 1, 2, 3, and 4. Also shown in FIG. 1A is a control means 28 which is used to electrically trigger the bias field means 24 and the propagation field means 26 to stabilize and move the domains in the magnetic sheet.

Before describing the details of the magnetoresistive sensing element 18 it is instructive to briefly summarize the operation of a magnetoresistive sensing device, such as device 16. Associated with sensing element 18 is a magnetization vector M which assumes a rest position as shown in FIG. 1A in the absence of a magnetic signal which would tend to rotate the magnetization vector into the direction of the applied magnetic signal. When a magnetic field (flux) is applied in a direction transverse to the direction of magnetization M, this vector tends to rotate into the direction of the applied signal field and its rotation causes a change in the resistance of sensing element 18, via the magnetoresistive effect. This change in resistance across element 18, when multiplied by the constant current $I_s$, produces a voltage signal $V_s$ which is indicative of the magnetic signal field. Thus, a series of voltage pulses $V_s$ are produced at the utilization means 22 when magnetic signals are applied to sensing element 18. In the absence of applied magnetic signals, magnetization vector M returns to its rest position and the resistance of element 18 returns to its normal value.

Sensing element 18 is characterized in this invention by having its shape induced anisotropy at right angles to its uniaxial anisotropy. At quiescent state, the magnetization vector M is along the long dimension of element 18. This is achieved by making the shape anisotropy field larger than the uniaxial anisotropy field. The direction of the uniaxial anisotropy field is along the easy axis of sensing element 18, which is indicated by the double headed arrow labeled E.A. As will be noted, this easy axis is along the short dimension of element 18. The effective magnetic field associated with the shape induced anisotropy is in the direction of the long dimension of the sensing element 18. Thus, these effective magnetic fields are at right angles to one another and the magnetic threshold of sensing element 18 is $|H_{shape}-H_k|$. When a magnetic signal field having this value is applied in a direction substantially transverse to the direction of magnetization vector M, this vector will be rotated into the easy axis direction. When the magnetic signal field is removed, the magnetization vector will return to its rest position along the length of sensing element 18, if the shape anisotropy field is greater than the uniaxial anisotropy field. That is, of the two anisotropy magnetic fields, the larger of these must be normal to the direction of the magnetic signal field to insure that in the absence of a magnetic signal the magnetization vector M will return to its rest state.

With this background, FIG. 1A depicts the situation in which the magnetization vector M is lying along its rest position. No magnetic signal field is applied to sensing element 18.

Figure 1B:
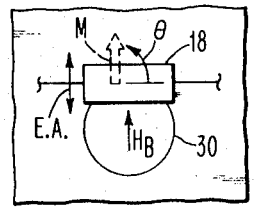
FIG. 1B is a diagram of the sensing element of FIG. 1A, shown when a bubble domain is present.

In FIG. 1B, a magnetic signal field corresponding to the stray magnetic field $H_b$ of a bubble domain 30 is applied in a direction substantially transverse to the direction of the magnetization vector in its rest position (FIG. 1A). This causes a rotation of vector M through an angle $\theta$ which in turn causes a change in resistance of element 18. As mentioned previously, this change in resistance is manifested as a voltage signal $V_s$.

Figure 2A:
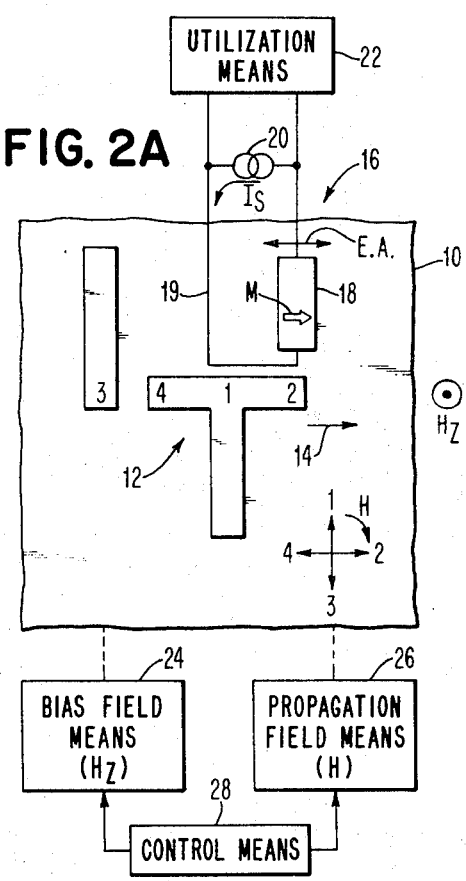
FIG. 2A is an illustration of an improved magnetoresistive sensing element having reduced magnetic field threshold and an easy axis substantially normal to the magnetic signal field direction, illustrated in a bubble domain environment.
Figure 2B:
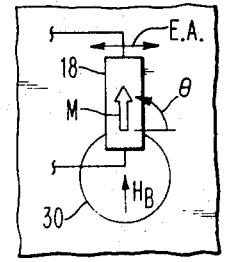
FIG. 2B is a diagram of the sensing element of FIG. 2A, shown when a bubble domain is present.

FIG. 2A shows another orientation of a magnetoresistive sensing device 16 in which the easy axis of the sensing element is substantially normal to the magnetic signal field produced by bubble domains moving along propagation means 12. In FIGS. 2A and 2B, the same reference numerals will be used as were used in FIGS. 1A and 1B, where the element provides the same function. Accordingly, in FIG. 2A a magnetic sheet 10 has a propagation means 12 located adjacent to it for movement of bubble domains along the direction indicated by arrow 14. Also located adjacent sheet 10 is the magnetoresistive sensing device 16, which comprises a magnetoresistive sensing element 18, and a constant current source 20 which is electrically connected to element 18 via conductors 19. The voltage across element 18 is supplied to utilization means 22 which is a sense amplifier or other known detector.

As with the system of FIG. 1A, a bias field $H_z$ is provided normal to magnetic sheet 10, via bias field means 24. The propagation field H used to move domains in conjunction with propagation means 12 is provided by propagation field means 26, which could be X and Y coils arranged around magnetic sheet 10 as was discussed previously. Control means 28 is used to electrically trigger the bias field means 24 and propagation field means 26.

Magnetoresistive sensing device 16 in FIG. 2A differs from that in FIG. 1A in that the sensing element 18 is arranged such that its easy axis, indicated by the arrow labeled E.A., is substantially normal to the magnetic signal field provided by a bubble domain in moving from position 1 to position 2 of the T bar shown in propagation means 12. That is, in the quiescent state the magnetization vector M is in the easy direction in the sensing element 18 of FIG. 2A in contrast with its being transverse to the easy axis direction in the element 18 of FIG. 1A. This is achieved by making the uniaxial anisotropy field larger than the shape anisotropy field. However, in both cases, the easy axis is along the short dimension of the sensing element 18.

The operation of magnetoresistive sensing device 16 in FIG. 2A is similar to that of device 16 in FIG. 1A. Referring to FIG. 2B, it is readily apparent that the magnetic signal field $H_b$ exerted by bubble domain 30 causes magnetization vector M of element 18 to rotate through the angle $\theta$ into a direction substantially transverse to its direction in the rest state (FIG. 2A). This causes a resistance change of sensing element 18 which is manifested as a voltage signal output to the utilization means 22.

In the sensing device 16 of FIG. 2A, the current direction is substantially normal to the easy axis direction, as it was in FIG. 1A. However, the current can be applied either along the easy axis direction or transverse to it.

The sensing device 16 of FIG. 2A is not as efficient as that of FIG. 1A, since the field $H_b$ of the bubble domain is not switching as large an area of magnetization as is the case in FIG. 1A, where the length of the sensing element transverse to the direction of the magnetic signal $H_b$ is approximately the bubble diameter. However, the principle of operation is identical in the devices shown in FIGS. 1A and 2A.

In the device of FIG. 2A, the shape anisotropy field $H_{shape}$ is downwardly directed along the long dimension of sensing element 18. The uniaxial anisotropy field is directed horizontally along the easy axis direction. In this element, the uniaxial anisotropy field is greater than the shape anisotropy field in order to insure that the magnetization vector M will return to its rest state in the absence of a magnetic signal.

Figure 3A:
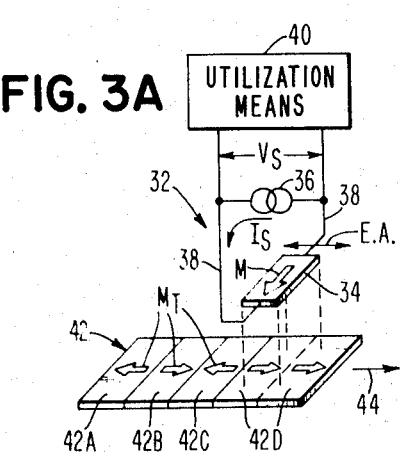
FIG. 3A is an illustration of an improved magnetoresistive sensing element having reduced magnetic threshold shown in a magnetic tape sensing environment.

In FIG. 3A, an improved magnetoresistive sensing device with lower magnetic threshold is applied to the sensing of magnetic signals from a medium such as a magnetic tape which is moving in proximity to the sensing device. In more detail, a magnetoresistive sensing device 32 comprises the magnetoresistive sensing element 34 which is electrically connected to a constant current source 36 via electrical conductors 38. Again, the voltage signal $V_s$ obtained from the sensing element 34 is directed to a utilization means 40 which could be a sense amplifier or other detection means.

Sensing device 32 is used to read magnetic fields from a magnetic tape 42 which is moved in the direction of arrow 44. The various magnetic domains of tape 42 are 42A, 42B, 42C, and 42D. Domain 42D has a dashed line across it, indicating that it is twice as wide as the other domains, in which the vectors $M_T$ successively change directions. The magnetization vectors $M_T$ of these domains are also indicated by arrows.

Sensing device 32 detects magnetic transitions along tape 42 as it moves past the sensing device. That is, the change in magnetization vector from one domain to the next is detected as a "1" bit while the absence of a change in magnetization is a "0" bit. For instance, a 1 bit would be detected between domains 42A and 42B since the magnetization vectors $M_T$ of these domains are oppositely directed.

Sensing element 34 operates the same way as sensing elements 18 of FIGS. 1A and 2A. Element 34 is intercepted by a magnetic field from the domains of the tape 42 and this causes a rotation of the magnetization vector M of the sensing element. Rotation of magnetization vector M causes a resistance change in this element which is detected as a voltage signal $V_s$. The magnetic field from tape 42 is transverse to the direction of magnetization vector M and is along the easy axis direction of sensing element 34. However, the magnetic signal field from tape 42 can be directed transversely to the easy axis of element 34, if this element is rotated 90° in its plane, as was done with the element of FIG. 2A.

Figure 3B:
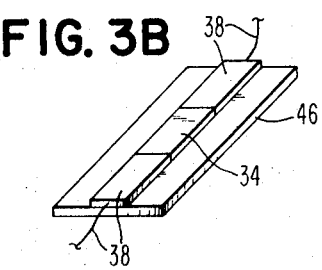
FIG. 3B is a diagram of a preferred structure for the magnetoresistive sensing element of FIG. 3A.

FIG. 3B shows a suitable structure for the sensing device 32. The magnetoresistive sensing element 34 is deposited on a substrate 46, which is an insulating material such as glass, quartz, or sapphire. Also deposited on substrate 46 are the electrical connections 38 to element 34. Thus, the structure is mechanically stable and when used in the apparatus shown in FIG. 3A, is mounted upside down so that film 34 is adjacent tape 42.

Design considerations

Any non-symmetrical geometry can be used for the sensing element. This will provide a shape-induced anisotropy which can be put at right angles to the uniaxial anisotropy. For instance, FIGS. 1A and 2A show two embodiments for a sensing device. In the first embodiment (FIG. 1A), $H_{shape} > H_k$ while in the second embodiment (FIG. 2A), $H_{shape} < H_k$. The following calculations will describe the design considerations used to provide length $l$ and width $w$ of sensing elements in these two embodiments.

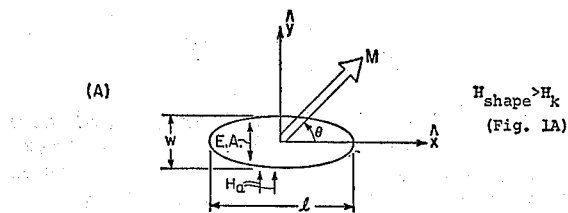

(Fig. 1A)

The magnetization vector M of the sensing element is in the plane of the element and is rotated through an angle $\theta$ by an applied magnetic signal field $H_a$. The demagnetizing field $HS_d$ is given by the expression $$\vec{H}_d = -N_x M \cos\theta \hat{x} - N_y M \sin\theta \hat{y}$$

where $N_x$, $N_y$ are demagnetizing factors $(N_y > N_x)$
$\hat{x}, \hat{y}$ are unit vectors in the $x$ and $y$ directions, respectively
$\vec{M} = M\cos\theta\hat{x} + M\sin\theta\hat{y}$ is the magnetization of the element.

The applied signal field $H_a$ is given by $$\vec{H}_a = \hat{y} H_a$$

The total energy is the sum of the uniaxial anisotropy energy, the demagnetizing field energy, and the applied field energy. That is, $$E_{tot} = k\cos^2\theta + (-\tfrac{1}{2}\vec{H}_d \cdot \vec{M}) + (-\vec{H}_a \cdot \vec{M})$$

where $E_{tot}$ is the total energy
$k$ is the uniaxial anisotropy energy.

Using the above expressions, this becomes $$E_{tot} = \left[k + \frac{(N_x - N_y)}{2} M^2\right] \cos^2\theta - H_a M \sin\theta + \frac{N_y}{2} M^2$$

to determine a minimum energy state $dE_{tot}/d\theta$ is set equal to zero. Doing this and solving for $\sin\theta$ yields $$\sin\theta = \frac{H_a}{2\frac{(N_y-N_x)}{2}M - \frac{2k}{M}} = \frac{H_a}{(N_y-N_x)M - H_k} = \frac{H_a}{(H_k)_{eff}}$$

where $(H_k)_{eff}$ is the threshold field required for saturation of the sensing element and is given by $$(H_k)_{eff} = (N_y - N_x)M - H_k$$

The ratio of the resistance change in the sensing element to the total possible resistance change is $$\frac{\Delta R}{\Delta R_{max}} = \sin^2\theta = \left(\frac{H_a}{H_{k_{eff}}}\right)^2$$

For a thin film having ellipsoidal cross-section, an approximation for $N_x$, $N_y$ is $$N_x = \frac{4\pi t}{l}$$

$$N_y = \frac{4\pi t}{w}$$

where $l$ is the dimension of the sensing element in its long direction,
$w$ is the dimension of the sensing element along its short direction, and
$t$ = film thickness.

The effective anisotropy field must be positive for the sensing element to work properly. Hence, $$(H_k)_{eff} = (N_y - N_x)M - H_k > 0$$

since $H_{shape} = > H_k$, and $$H_{shape} = 4\pi M t\left(\frac{1}{w} - \frac{1}{l}\right)$$

(1) $\quad \dfrac{1}{w} - \dfrac{1}{l} > \dfrac{1}{t}\left(\dfrac{H_k}{4\pi M}\right)$

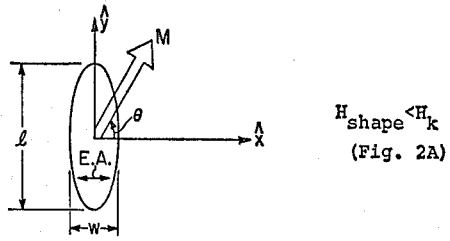

(Fig. 2A)

$$E_{tot} = K\sin^2\theta + \frac{N_x}{2}M^2\cos^2\theta + \frac{N_y}{2}M_2\sin^2\theta - H_a M \sin\theta$$

$$= \left[K + \frac{(N_y - N_x)}{2}M^2\right]\sin^2\theta - H_a M \sin\theta + \frac{N_x}{2}M^2$$

$$\frac{dE_{tot}}{d\theta} = 0 = \frac{H_a M}{2\left[k - \frac{(N_x - N_y)}{2}M^2\right]} = \frac{H_a}{(H_k)_{eff}}$$

where $$(H_k)_{eff} = H_k - (N_x - N_y)M$$

As previously done, $N_x = 4\pi t/w$ and $N_y = 4\pi t/l$. Then (2) $\quad \dfrac{1}{w} - \dfrac{1}{l} < \dfrac{1}{t}\dfrac{H_k}{4\pi M}$ Equations 1 and 2 give the conditions for length $l$ and width $w$ which will provide a sensing element having proper shape-induced anisotropy. In each embodiment, the result is that the effective uniaxial anisotropy along the $x$ direction has its effective anisotropy decreased by putting the shape anistropy and uniaxial anisotropy at right angles. The magnitude of the effective anisotropy field is the magnitude of the difference between the shape anisotropy field $(N_y - N_x)M$ and the usual uniaxial anisotropy field $H_k$.

Process of fabrication

In the case of the sensing device 16 shown in FIGS. 1A and 2A, the magnetoresistive sensing element is deposited directly on magnetic sheet 10 by conventional techniques such as sputtering, evaporation, or electro-plating. Conveniently, this material is permalloy since the propagation means 12 can also be fabricated of permalloy. In order to deposit a magnetoresistive sensing element 18 having shape anisotropy field at right angles to the uniaxial anisotropy field, the following steps are suitable:

(1) A sheet of permalloy (81% Ni, 19% Fe) is evaporated onto magnetic sheet 10. The evaporation occurs at approximately 330° C. and in the presence of a magnetic field of about 20 oe. The magnetic field is directed along the desired direction for the easy axis and the deposited permalloy has an easy axis in this direction.

(2) After this, the area of the evaporated permalloy to be used for the sensing element is protected with a photoresist.

(3) A conductor, such as gold or copper, is then electroplated as a sheet.

(4) The conductor sheet and the permalloy sheet are then etched to define the sensing element area and the conductor leads to the element.

In fabricating the sensing device 32 of FIG. 3A, the same basic techniques are used, except that the sensing element 34 is deposited on a non-magnetic insulating substrate 46, rather than on a magnetic sheet, such as sheet 10 of FIG. 1A.

If a permalloy propagation means is to be fabricated also, reference is made to copending application Ser. No.

192,547, filed in the name of George S. Almasi et al., on the same day as the present application, and assigned to the present assignee.

Examples

A permalloy magnetoresistive sensing element having a thickness of 250 angstroms, a width of 0.5 mil, and a length of 2.5 mil with the easy axis parallel to the 0.5 mil edge has a shape anisotropy field of 16 oe. (since $H_{d_{short}}=20$ oe. and $H_{d_{long}}=4$ oe.). A uniaxial anisotropy field $H_k$ of 10 oe. is not sufficient to maintain the magnetization along the easy axis, and thus at the quiescent state the magnetization vector would assume a direction substantially parallel to the 2.5 mil edge which is the case shown in FIG. 1A. If the easy axis is along the 2.5 mil edge, a field equal to $|H_{shape}+H_k|$ is required to rotate the magnetization. However, if the easy axis is along the 0.5 mil edge of the film, the threshold field for rotation is $|H_{shape}-H_k|=20-10$ oe. Thus, the magnetization vector can be rotated into the easy axis by a magnetic signal field having this magnitude, which is typically obtainable from bubble domains of small size.

As another example, a permalloy sensing element of about 200 angstroms thickness having a length of approximately 0.3 mil (7.5 microns) and width 0.2 mil (5 microns) can be used to sense bubble domains of micron sizes. For instance, a 5 micron bubble domain can be sensed if the easy axis orientation is along the small dimension of the sensing element, while the magnetization is aligned along the long dimension of the film in its rest state. To further increase the magnetoresistive effect cobalt can be added to the sensing element.

What has been described is a magnetoresistive sensing device in which the shape anisotropy and the uniaxial anisotropy are arranged at right angles to one another in the sensing element, in contrast with the usual situation in which these anisotropies are aligned. It has been assumed that all of the magnetization will switch in the sensing element and that the sensing element will not break down into closure domains. This can be shown by calculations to be a correct assumption and the sensing element will act as a single magnetic domain. The teaching of this invention has applicability in any environment in which all magnetic signals are to be sensed. It is particularly suitable in a bubble domain environment where the stray magnetic field of micron size bubbles is very small.

What is claimed is:

1. A magnetoresistive sensing device for detection of magnetic signal fields, comprising:
    a magnetoresistive sensing element having a magnetization which is in a first rest position in the absence of said magnetic signal field intercepting said element and which is rotated from said rest position when said magnetic signal field intercepts said element, thereby causing the resistance of said element to change, said element being characterized by a shape anisotropy magnetic field and a uniaxial anisotropy magnetic field which are substantially perpendicular to each other, the larger of said two anisotropy fields being substantially perpendicular to the direction of said magnetic signal field,
    an electrical source for biasing said sensing element, said source providing current through said element,
    output means for detecting said change of resistance in said element when said magnetic signal field intercepts said element.

2. The device of claim 1, where said sensing element has a length $l$ which is greater than its width $w$, and wherein the magnetic easy axis of said element is along a direction substantially parallel to the direction along which said width is measured.

3. The device of claim 2, wherein said length $l$ and width $w$ are related to the thickness $t$ of said element, the uniaxial anisotropy field $H_k$, and the magnetization M of said element by the following relationship:

$$\frac{1}{W}-\frac{1}{l}>\frac{1}{t}(H_k/4\pi M)$$

4. The sensing device of claim 2, wherein said width $w$ and length $l$ are related to the thickness of said element, the uniaxial anisotropy field $H_k$, and the magnetization M of said element by the following relationship:

$$\frac{1}{W}-\frac{1}{l}<\frac{1}{t}(H_k/4\pi M)$$

5. The sensing device of claim 1, wherein said film is characterized by a magnetic easy axis and said rest position of said magnetization is along the direction of said magnetic easy axis.

6. The sensing device of claim 1, wherein said sensing element is comprised of permalloy.

7. The sensing device of claim 1, wherein said sensing element is adjacent a magnetic sheet in which cylindrical magnetic domains exist, said domains producing said magnetic signal field which intercepts said sensing element.

8. The sensing device of claim 2, where said current through said element travels in a direction substantially perpendicular to said easy axis.

9. The device of claim 1, where said current through said element travels in a direction substantially perpendicular to said magnetic signal field.

10. The device of claim 1, where said element has a magnetic easy axis and said magnetic signal field is substantially parallel to said easy axis.

11. The device of claim 1, where said shape anisotropy field is greater than said uniaxial anisotropy field.

12. The device of claim 1, where said shape anisotropy field is less than said uniaxial anisotropy field.

13. The device of claim 1, further including a magnetic recording medium in flux-coupling proximity to said magnetoresistive sensing element, the stray magnetic fields in said recording medium intercepting said element and rotating said magnetization of said element.

14. A magnetoresistive sensing element for detection of magnetic signal fields, comprising:
    a magnetoresistive sensing element having nonsymmetrical geometry and a resistance which is dependent on the magnetic flux which intercepts said element, said element being characterized by mutually perpendicular shape anisotropy field and uniaxial anisotropy field, wherein the larger of these two anisotropy fields is substantially perpendicular to said magnetic signal field,
    means for supporting said magnetoresistive sensing element,
    electrical means for providing current through said element,
    output means responsive to the change in resistance of said element in the presence and absence of said magnetic signal fields.

15. The device of claim 14, where said means for supporting said element is a magnetic sheet in which cylindrical magnetic domains exist.

16. The device of claim 14, wherein said shape anisotropy field is greater than said uniaxial anisotropy field.

17. The device of claim 14, where said shape anisotropy field is less than said uniaxial anisotropy field.

18. The device of claim 14, wherein said magnetoresistive sensing element is a film comprised of permalloy.

19. The sensing device of claim 14, where said current moves in a direction substantially perpendicular to the direction of said applied signal field.

20. The device of claim 14, where said element has a length $l$ which is unequal to its width $w$, and is characterized by an easy magnetic axis substantially parallel to the direction of said width $w$.

21. The device of claim 14, wherein said length $l$ and width $w$ are chosen to satisfy the relationship:

$$\frac{1}{W} - \frac{1}{l} > \frac{1}{t}(H_k/4\pi M)$$

where $t$ is the thickness of said sensing element,
$H_k$ is the uniaxial anisotropy field, and
$M$ is the magnetization of said element.

22. The device of claim 20, wherein said length $l$ and width $w$ are chosen to satisfy the relationship:

$$\frac{1}{W} - \frac{1}{l} < \frac{1}{t}(H_k/4\pi M)$$

where $t$ is the thickness of said sensing element,
$H_k$ is the uniaxial anisotropy field, and
$M$ is the magnetization of said element.

23. The device of claim 14, wherein said signal magnetic field is directed substantially parallel to said uniaxial anisotropy field.

24. The device of claim 14, wherein said signal magnetic field is directed substantially perpendicular to said uniaxial anisotropy field.

25. A magnetoresistive sensing device for detection of magnetic signal fields, comprising:
a magnetoresistive sensing element whose resistance changes when said magnetic signal fields intercept said element, said element having a non-symmetrical geometry with a length $l$ and a width $w$ such that $l > w$, wherein said element exhibits a shape anisotropy magnetic field and a uniaxial anisotropy magnetic field which are at right angles to one another, the larger of said anisotropy fields being substantially perpendicular to the direction of said magnetic signal fields, said element being further characterized by a magnetic easy axis which is directed substantially parallel to said width,
means for supporting said sensing element,
an electrical source for providing current to said element,
output means connected to said element for detecting the resistance of said element in the presence and absence of said magnetic signal fields.

26. The device of claim 25, where said shape anisotropy field is greater than said uniaxial anisotropy field.

27. The device of claim 25, where said shape anisotropy field is less than said uniaxial anisotropy field.

28. The device of claim 25, further including a magnetic sheet in which cylindrical magnetic domains exist, said sheet being sufficiently close to said sensing element that the stray magnetic fields of said cylindrical domains intercept said sensing element.

29. The device of claim 25, wherein said sensing element is comprised of permalloy.

30. A magnetoresistive sensing device for detection of cylindrical magnetic domains, comprising:
a magnetic sheet in which said domains exist, said domains having stray magnetic fields associated therewith,
a magnetoresistive sensing element responsive to said stray magnetic field located sufficiently close to said magnetic sheet that it is in flux-coupling proximity to said stray magnetic field, said element being characterized by having a shape anisotropy magnetic field and a uniaxial anisotropy magnetic field which are substantially perpendicular to each other, the larger of said anisotropy fields being in a direction substantially perpendicular to the stray fields of said domains,
electrical means for providing current through said sensing element,
output means for detecting the resistance of said element in the presence and absence of said stray magnetic fields intercepting said element.

31. The device of claim 30, where said sensing element is comprised of permalloy.

32. The sensing device of claim 30, where said sensing element has a non-symmetrical geometry characterized by a length $l$ which is greater than its width $w$, said element having a magnetic easy axis directed parallel to said width.

33. The device of claim 32, wherein the direction of the stray magnetic field from said domain is substantially parallel to said easy axis.

34. The device of claim 33, wherein said shape anisotropy field is greater than said uniaxial anisotropy field.

References Cited

UNITED STATES PATENTS 3,493,694  2/1970  Hunt _____ 324—46

ROBERT J. CORCORAN, Primary Examiner

U.S. Cl. X.R.
179—100.2 CH; 338—32 R; 340—174 EB